July 18, 1933.  J. C. CROWLEY  1,918,689
AIR CHUCK
Filed Feb. 24, 1931
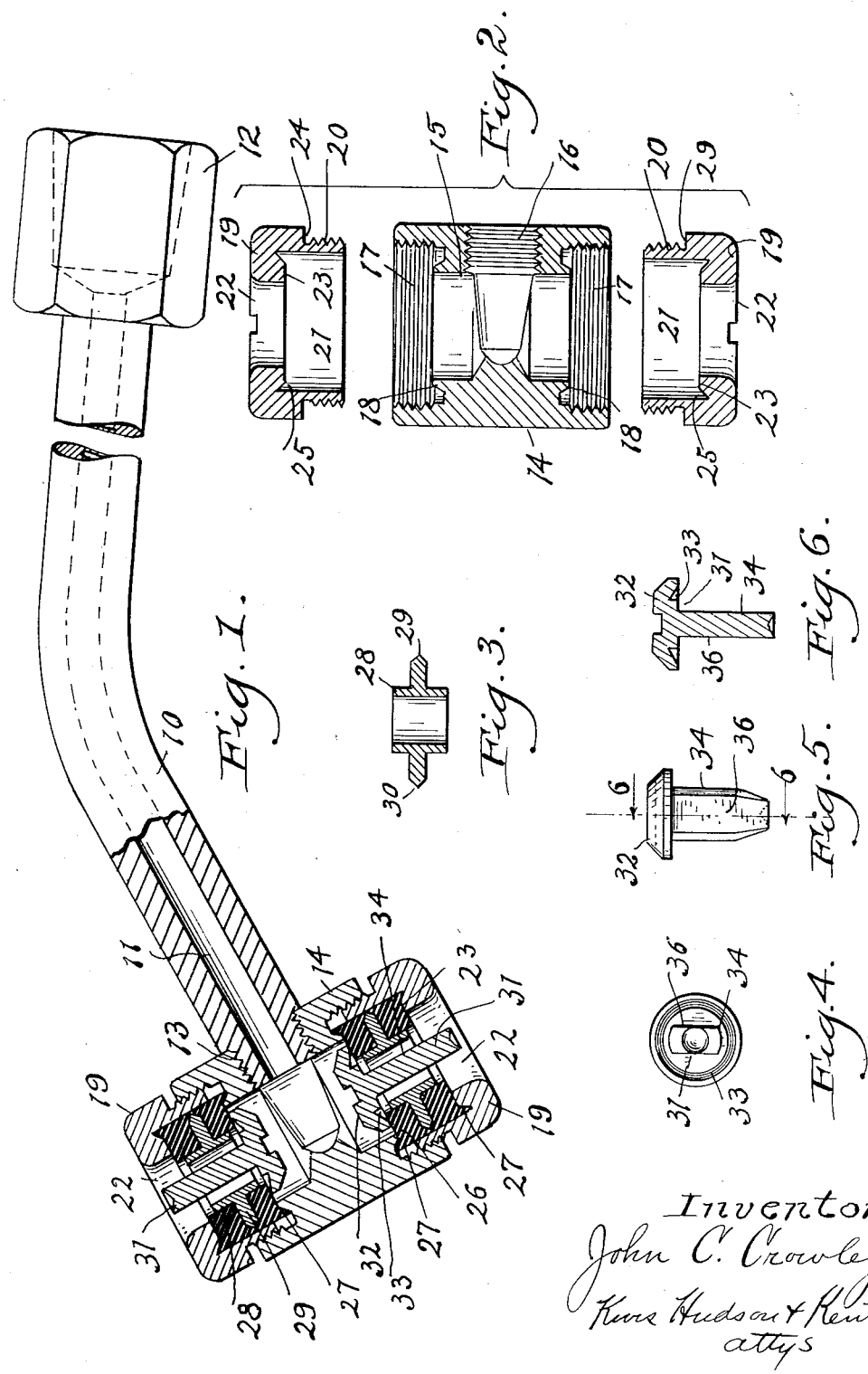
Inventor,
John C. Crowley
Kwis Hudson & Kent
attys Patented July 18, 1933

1,918,689

UNITED STATES PATENT OFFICE

JOHN C. CROWLEY, OF CLEVELAND HEIGHTS, OHIO, ASSIGNOR TO THE DILL MANUFACTURING COMPANY, OF CLEVELAND, OHIO, A CORPORATION OF OHIO

AIR CHUCK

Application filed February 24, 1931. Serial No. 517,855.

This invention relates to an air chuck particularly adapted to be used on the end of an air hose for inflating rubber articles such as pneumatic tires although of course the chuck is not limited to this use alone.

An object of the invention is to provide a device of the character above set forth for connecting a hose line from a source of supply of fluid pressure to the valve stem of a pneumatic tire or other article to be inflated which may be easily and conveniently applied to the valve stem irrespective of the type of wheel upon which the tire is mounted and irrespective of the location of the valve stem.

Another object is to provide a device of this character having a plurality of chucks associated therewith in such manner that the escape of air from the hose line is efficiently prevented when the chucks are not in use while the construction is such that the valve of any one of the chucks may be readily unseated when it is desired to connect such chuck to a valve stem.

A further object is to provide a device of this character which is of simple construction, formed of a relatively few number of parts of such strength that the device will readily withstand the treatment to which it is subjected in ordinary use.

Additional objects and advantages will become apparent as the description proceeds.

An embodiment of the invention is illustrated in the accompanying drawing wherein Figure 1 is a sectional view through the air chuck.

Fig. 2 is a sectional view through the head of the device showing the chuck retaining members separated therefrom.

Figs. 3, 4 and 5 are detail views; and

Fig. 6 is a sectional view of one of the valve members taken substantially on line 6—6 of Fig. 5.

In certain types of motor vehicle wheels, the valve stems of the pneumatic tires on the wheels are so arranged and formed as to be difficult of access with the result that sometimes it is hard to apply the ordinary form of air chuck to the valve stems. There are other types of motor vehicle wheels such as dual wheels wherein the valve stems of the pneumatic tires are not only difficult to reach with the ordinary air chuck of an air line, but there being two valve stems on each wheel, it is necessary to reverse the chuck after it has been connected to one tire in order to apply it to the valve stem of the other tire of the wheel. Furthermore the angularity of the bends in the stems makes it difficult to reach them with the chuck and often the brake drum interferes with access to the stem of the inner wheel. The device of the present invention includes an air chuck member which may be quickly and conveniently applied to the valve stems of pneumatic tires upon all types of motor vehicle wheels. Air chucks are commonly employed in connection with air pressure systems in garages, service stations and similar places and since they are subjected to severe treatment and usage it is necessary that they be strongly constructed and not easily broken or rendered inoperative. It is also important that the chuck be provided with an efficient valve for preventing the escape of air from the hose line when the device is not in use and that such valve be readily responsive to movement from its seat when the device is applied to a valve stem and to its seat when the device is removed from the stem. It is a further advantage that an air chuck of this character be formed of a minimum number of parts so that the chuck may be economically manufactured to enable it to be sold at a relatively small cost.

The device of the present invention fully provides for all the conditions set forth above as will become clear hereinafter.

The device comprises a stem portion 10 preferably in the form of an elbow so as to enable it to be readily positioned upon the valve stem of a pneumatic tire as, for instance, to allow the chuck to be passed over or around the brake drum of the inner wheel of a dual wheel, the stem 10 having an air passage 11 therethrough and being provided at one end with a hose connecting portion 12 as is well understood in the art. The opposite end of the stem 10 is preferably threaded as indicated at 13 to enable the stem to be connected to a head or valve housing member 14.

The head or valve housing member 14 is disclosed herein as substantially cylindrical although it should be understood that the shape of this member may vary as desired. The head or member 14 is provided with a chamber 15 intermediate its ends and extending longitudinally of the member, a radially extending threaded opening 16 being formed in the member 14 and enabling the threaded end 13 of the stem 10 to be attached to the head or member so that the bore 11 thereof will be in communication with the chamber 15 and such chamber in turn placed in communication with the source of supply of air or other fluid pressure. Extending outwardly into each of the counterbores 17 is an annular rib 18 formed on the shoulder formed by the inner end of the counterbore and surrounding the opening between the counterbore and the chamber 15.

A nut 19 externally threaded at 20 is screwed into each counterbore 17 as clearly indicated in Fig. 1. The threaded portion 20 of the nut 19 is reduced in external diameter and is provided with an annular counterbore 21 communicating with a smaller bore 22 and having a shoulder 23 at its base. The outer end of each nut 19 is enlarged and is provided with an outwardly extending annular flange 24 arranged to engage with the end of the head or valve housing member 14 when the nut is screwed into the counterbore 17 and to thus limit or define the inward position of the nut. The shoulder 23 at the base of the counterbore 21 is provided at its outer edge with an annular substantially V-shaped notch 25 so that when an annular flexible washer 26, preferably formed of rubber and having oppositely extending V-shaped ribs 27 is seated upon the shoulder 23 one of the annular ribs 27 will seat in the V-shaped notch 25. The washer 26 is of a diameter corresponding to the diameter of the bore 17 and is provided with a central opening smaller than the diameter of the bore 22 in the nut 19 whereby a portion of the washer will extend beyond the circumferential edge of the bore 22.

A sleeve 28 having an outwardly extending annular flange 29 located intermediate its ends is positioned in the central opening in the washer 26 with the annular flange 29 extending over and resting upon one side of the washer. As clearly shown in Figs. 1 and 3 the circumferential outer edge of the flange 29 is tapered or pointed as indicated at 30.

A second washer 26 is arranged upon the sleeve 28, this second washer engaging the opposite side of the flange 29 from that engaged by the first mentioned washer. It will be seen that the adjacent annular V-shaped ribs 27 on the two washers on each counterbore will seat in the complementary spaces provided by the pointed edge 30 of the flange 29 and the wall of the counterbore 21. The other annular V-shaped rib 27 of the second washer 26 will seat and mate with the V-shaped or pointed annular rib 18 in the counterbore 17.

It will be noted that when the nut 18 with the two washers 26 and the sleeve 28 arranged as just above described is screwed into the valve housing member or head 14 that the washers will be firmly compressed and will provide an air tight seal thus leaving the aligned openings through the washers, the passage through the sleeve 28 and the bore 22 of the nut 19 as the only passageway in each counterbore for the passage of air into the chamber 15 in the head or valve member 14.

These passageways for the passage of air from the chamber 15 are closed by valves 31 each of which is provided with a head having a flange 32 extending outwardly and downwardly and formed on its under side with a substantially V-shaped groove 33. Projecting from the head is a pin 34 substantially circular in shape except for diametrically opposed flats 36. A valve 31 is arranged in each of the sleeves 28 with the heads thereof located inwardly of the innermost gaskets 26 and within the chamber 15 so that the narrow under edge of the outwardly extending flange portions 32 will rest upon the gaskets or washers 26 which in this instance form valve seats for the valves. The pins 34 of the valves have a sliding fit in the bore of the sleeves 28 while the flats 36 furnish a maximum passage for the air when the valve has been raised and the valve head unseated. In assembling each of the chucks in the head or valve receiving member 14 the chuck washers or gaskets 26 are arranged in the counterbores 21 of the nuts 19, an annular rib 27 of the gaskets fitting in the notch 25. The sleeves 28 are then arranged in the central openings of the gaskets with the annular flange 29 extending between the gaskets and the adjacent ribs 27 of the gaskets fitting the pointed or tapered end 30 of the flange. The valves 31 are then positioned by passing the pins 34 through the sleeves 28 with the heads 32 of the valve located inwardly of the innermost gasket, the edge of the flange on the valve head resting upon the inner gasket 26 as clearly shown in Fig. 1. The nuts 19 may then be screwed into the valve housing or head member 14 until the innermost gaskets are engaged with the ribs 18 of the member 14 and the gaskets firmly compressed in the counterbores 17. It will be noted that the heads of the valves are relatively large and extend over the innermost gaskets 26 and are located within the chamber 15 whereby the pressure of air or other fluid in the chamber will maintain all of the valves in their seated position and thus prevent the escape of the fluid or air from the line. When any one of the chucks is applied to the valve stem of a pneumatic tire the outer end of its pin 34 engages the pin of the valve insides thereby opening the valve insides to permit the passage of air therethrough, at the same time the outermost gasket 26 engages the end of the valve stem and forms a seal between the valve stem and the chuck. In pressing the chuck upon the valve stem the engagement of the pin 34 with the pin of the valve insides and with the valve stem will raise the valve sufficiently to unseat the head 32 and thereby allow the air in the chamber 15 to pass through the opening in the gasket and through the sleeve 28 into the valve stem, it being remembered that the flats 36 on the valve pin 34 provide a maximum passage for the air. When one of the chucks is being used the air pressure in the chamber 15 will maintain the valve of the other chuck closed so that there will be no escape of air through this latter chuck and when the device is removed from the valve stem the air pressure in the chamber 15 will close all of the valves.

It has already been stated that on certain types of wheels the valve stems are located in positions that are hard to reach and that often the stems are bent to various angles, and it need hardly be pointed out that the device described herein will greatly facilitate the reaching of such valve stems with an air chuck for performing the inflating operation. It is also well to note that upon dual wheels the valve stems are often oppositely disposed which necessitates that a person applying an air chuck to such stems is required to push the chuck upon one of the stems in a direction away from his position and in applying the chuck to the other stem to reverse the same and pull it toward his position. With the device disclosed herein one chuck member may first be positioned over or upon one of the valve stems of one of the wheels and then the other chuck member may be positioned over the valve stem of the other wheel without reversing the device and thereby greatly facilitating the operation.

A device such as has been described further facilitates the application of the chuck to valve stems such as have just been mentioned since the curved stem 10 of the device facilitates passing the head 14 around the brake drum to the stem of the inner wheel.

Although a preferred embodiment of the invention has been illustrated and described herein it should be understood that the same is susceptible of various modifications and adaptations within the scope of the appended claim.

Having thus described my invention I claim:

A device of the character described comprising a member having a chamber therein adapted to be connected with a fluid pressure line and having counterbores at opposite ends communicating with said chamber, gaskets arranged in said counterbores and having central openings therethrough, sleeves supported by said gaskets and arranged in the openings therein, and independent valves having enlarged head portions arranged in said chamber and pins extending therefrom and passing through said sleeves, said pins having diameters such as to be slidably guided by said sleeves and being provided with longitudinally extending flats, said valves being movable independently of said gaskets and each other and the heads thereof being maintained seated on said gaskets by the fluid pressure in said chamber.

JOHN C. CROWLEY.